United States Patent

[11] 3,583,513

[72] Inventors Richard G. Macadam
 Birmingham;
 Stephen L. Wlazlo, Warren, both of, Mich.
[21] Appl. No. 789,723
[22] Filed Jan. 8, 1969
[45] Patented June 8, 1971
[73] Assignee Chrysler Corporation
 Highland Park, Mich.

[54] SERVICE HATCH
 3 Claims, 3 Drawing Figs.
[52] U.S. Cl. .................................................. 180/69
[51] Int. Cl. .................................................. B62d 25/10
[50] Field of Search ........................................ 180/69, 54,
 89; 296/76

[56] References Cited
 UNITED STATES PATENTS
 1,981,093 11/1934 Conarroe .................. 180/69X 2,711,341 6/1955 Mills et al. .................. 180/69X
 FOREIGN PATENTS
 448,394 6/1936 Great Britain ............... 180/69

Primary Examiner—Leo Friaglia
Assistant Examiner—Milton L. Smith
Attorney—Harness, Talburtt & Baldwin ABSTRACT: A hood construction for the engine compartment of an automobile in which the hood itself is semipermanently attached to the automobile body and includes a relatively small service opening closed by a small service hatch. The service opening is arranged to overlie such oft serviced items as the lubricant filler pipe, lubricant dipstick, radiator filler opening, and storage battery so that routine servicing of the vehicle may be accomplished without opening the hood.

PATENTED JUN 8 1971
3,583,513
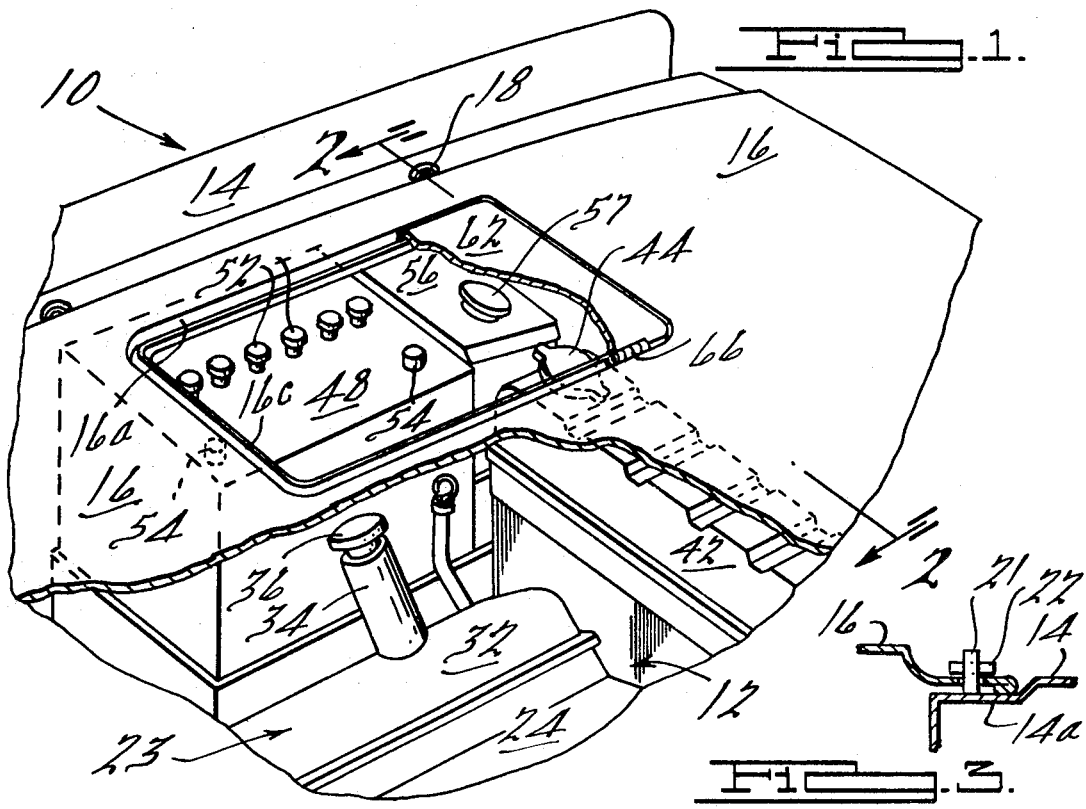
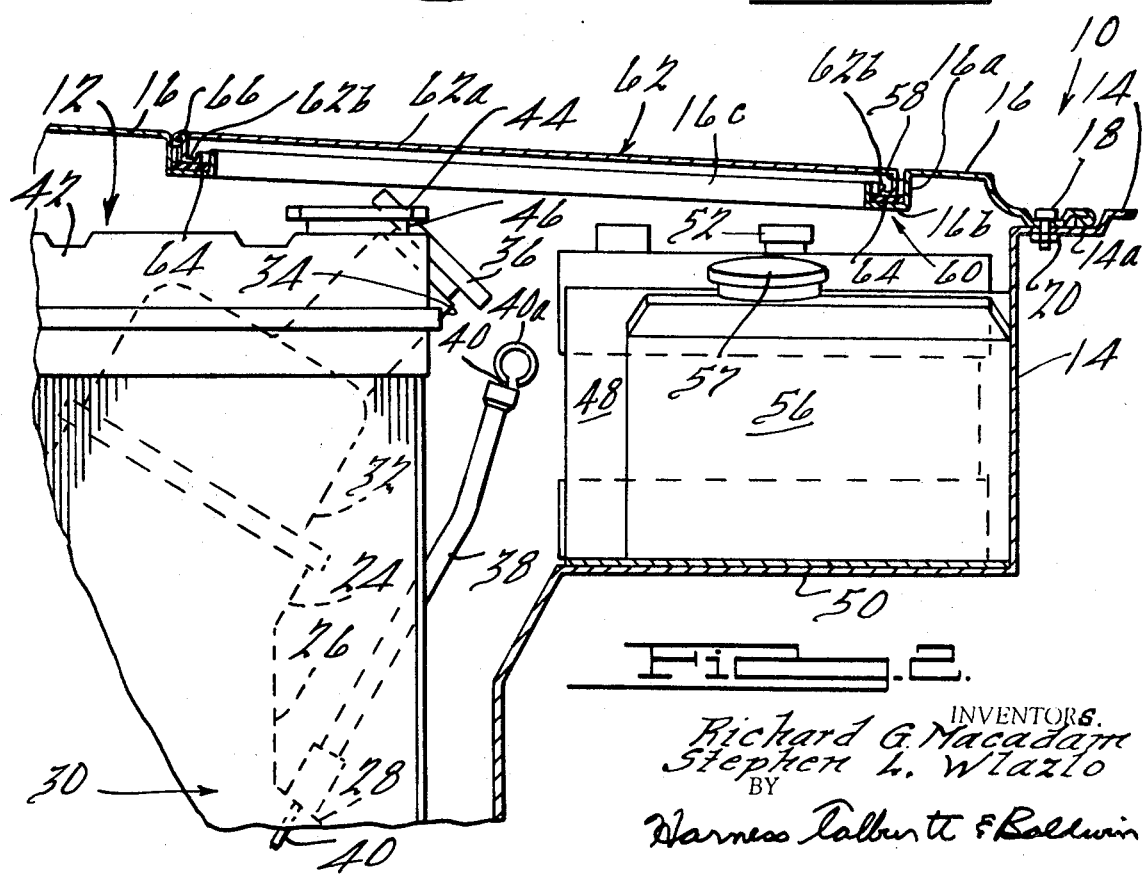
INVENTORS.
Richard G. Macadam
Stephen L. Wlazlo
BY
Harness Dickey & Pierce
ATTORNEYS.

SERVICE HATCH

BACKGROUND OF INVENTION

This invention relates to motor vehicles and, more particularly, to servicing facilities for motor vehicles of the type including an engine compartment and an internal combustion engine situated within the engine compartment. Internal combustion engines require periodic minor servicing operations. As motor vehicles are presently designed, it is necessary to raise the rather large, cumbersome hood overlying the engine compartment to effect even the most minor servicing operation. This is a difficult, sometimes strenuous operation which is not commensurate with the magnitude of the usual servicing operation to be performed.

SUMMARY OF INVENTION

It is an object of the present invention to facilitate routine engine compartment servicing of motor vehicles.

A more specific object is to provide an automobile hood construction which will allow routine servicing of the engine compartment without raising the hood itself.

According to the invention, the usual hood is semipermanently attached to the vehicle body and is provided with a service opening closed by a service hatch; the elements of the engine assembly requiring routine servicing are grouped directly beneath the service opening so that the engine may undergo routine servicing through the service opening without necessity of raising the hood. In a typical installation, the lubricant dipstick, lubricant filler opening, radiator filler opening, and storage battery filler caps are grouped beneath the service opening to facilitate routine service station servicing operations.

Other objects and features of the invention will be apparent from the detailed description of a preferred embodiment of the invention and from the accompanying drawing.

BRIEF DESCRIPTION OF THE DRAWING

In the drawing:

FIG. 1 is a perspective fragmentary view of the front end of an automobile;

FIG. 2 is a cross-sectional view taken on line 2–2 of FIG. 1; and

FIG. 3 is a fragmentary view showing a modification of a portion of the hood fastener structure shown in FIGS. 1 and 2.

DETAILED DESCRIPTION OF THE PREFERRED EMBODIMENT

The motor vehicle seen fragmentarily in FIGS. 1 and 2 includes a forward body structure 10 defining an engine compartment 12. Body structure 10 includes fender sheet metal 14 at either side of compartment 12 and a hood 16 adapted to overlie compartment 12.

Hood 16 is semipermanently secured to body structure 10 as by fastener screws 18 received in depressions 16a provided at spaced locations along the longitudinal peripheries the longitudinal peripheries of the hood; screws 18 pass through holes in the bottoms of depressions 16a and through aligned holes in shoulder portion 14a of the fender sheet metal for threaded engagement with nuts 20 welded to the underface of fender shoulder portion 14a.

Alternatively, and as seen in the modification of FIG. 3, the hood fastener members may comprise pins 21 rigidly upstanding from shoulder portion 14a and passing through suitable apertures in the hood for receipt of small metal cotter-type pins 22 passing through cross bores in the upper ends of pins 21.

An engine 23 of V design is suitably positioned within the engine compartment 12. Only the left bank of the engine is seen in the drawing. This bank includes a head 24, a block 26 defining a crankcase 28 coacting with an oil pan (not shown) to define a lubricant reservoir or sump 30, a valve cover 32, a lubricant filler cap 36 removably positioned on the upper end of filler pipe 34 to allow addition of lubricant to reservoir 30, a dipstick tube 38 projecting upwardly from crankcase 28, and a dipstick 40 slideably received in tube 38. Stick 40 projects at its lower end into reservoir 30 and defines a handle 40a at its upper end to facilitate grasping.

Engine 23 also includes the usual cooling system including a radiator 42 disposed in upright position forwardly of the engine proper. Radiator 42 includes a filler cap 44 releasably secured to a filler spout 46 and the tip of the radiator.

A storage battery 48 is also positioned within the engine compartment. Battery 48 sits on a shelf 50 defined by the fender sheet metal and includes a plurality of filler caps 52 and a pair of electrical terminals 54.

The motor vehicle further includes a windshield wiping and washing system of known form and including the usual reservoir for storing windshield washer solvent. The washer solvent reservoir takes the form of a plastic jar 56 positioned on shelf 50 forwardly of battery 48 and including a removable cap 57 to allow replenishing of the solvent in the jar.

Lubricant filler cap 36, handle 40a of dipstick 40, radiator filler cap 44, battery filler caps 52, and solvent reservoir 56 are all grouped together in the forward left section of the engine compartment and a service opening 58 is provided in hood 16 directly over these grouped routine service items. Opening 58 is thus located generally to the left of the vehicle centerline and generally forwardly of the hood. Although opening 58 in the disclosed embodiment is generally rectangular, it will be apparent that the size and shape of the opening will be dictated by the extent and grouping of the engine compartment items to be serviced therethrough.

Service opening 58 is defined by a hood rim structure seen generally at 60. Rim structure 60 includes a downturned flange 16a, an internal flange 16b, and an upturned flange 16c. A service hatch 62 is adapted to coact with hood rim structure 60 to selectively close service opening 58. Hatch 62 includes a main body plate portion 62a and a downturned rim portion 62b which sealingly coacts in the closed position of the hatch with a resilient gasket member 64 positioned in the upturned continuous channel defined by hood rim structure 60. Hatch 62 is pivotally mounted at its inboard longitudinal edge to the adjacent edge of the hood as by a plurality of piano hinges 66 and suitable spring means (not shown) operate to maintain the hatch in its closed position. A handle (not shown) may be provided on the hatch to facilitate movement of the hatch to its open position and a lock mechanism (not shown) may be provided to lock the hatch to hood 16.

It will be seen that the disclosed hood structure and engine compartment arrangement allows all routine servicing to be done through the service hatch without raising hood 16. Specifically the operator or a service station attendant positioned at the left side of the vehicle may pivot hatch 62 upwardly away from himself to provide convenient access to the engine compartment; with the hatch in raised position, the operator or attendant may readily check and/or replenish the engine lubricant, the cooling system fluid, the battery fluid, and the washer solvent, all without raising the hood. The hood is raised only for relatively major servicing operations and is otherwise maintained in a semipermanent position on the body structure by the mounting screw fasteners 18 or the pin fasteners 21, 22. The rigid hood holddown arrangement allows the hood to be designed as a structural part of the vehicle body, thereby adding rigidity to vehicle body, and allows the elimination of the costly hood hinge and hood-latching structures necessary with the typical hinged hood construction.

Although a preferred embodiment of the invention has been illustrated and described, it will be apparent that various changes and modifications may be made in the disclosed embodiment without departing from spirit or scope of the invention. For example, the engine and accessory items may be arranged to group other serviceable items generally beneath the service opening. Such other items may include electrical fuses, brake fluid level indicators, transmission fluid level indicators, electrical master switches, power steering fluid level indicators, etc.

We claim:
1. A motor vehicle comprising
A. two spaced fenders defining an engine compartment, each of said fenders having an upper generally horizontal surface portion extending lengthwise of the fender;
B. an engine positioned within said compartment between said two fenders and below said horizontally extending fender surface portions;
C. a generally flat hood being located between said spaced fenders and overlying said engine, said hood cooperating with said horizontal fender portions to define a generally horizontal surface extending the width of the motor vehicle;
D. fastener members provided at spaced locations along the longitudinal peripheries of the hood interconnecting said fenders and said hood, and permitting said hood to be removed, removal of said hood resulting in exposure of the entire engine; and
E. a service hatch carried by said hood in a generally horizontal plane, said hatch being movable from a closed position substantially in the plane of said hood and in registry with said service opening to an open position allowing access to selected engine components.

2. A motor vehicle according to claim 1 wherein said spaced fenders and said hood are interconnected by fastener screws located in openings provided at spaced positions along the longitudinal peripheries of the hood, said screws being received in cooperating openings in said generally horizontal surface fender portions.

3. A motor vehicle according to claim 1 wherein said spaced fenders and said hood are interconnected by pins upstanding from said generally horizontal surface fender portions, said pins passing through cooperating apertures in said hood and being provided with cross bores in their end portions for receipt of cotter-type pins.